J. C. PHELPS.
INSULATING CAP.
APPLICATION FILED SEPT. 16, 1909.

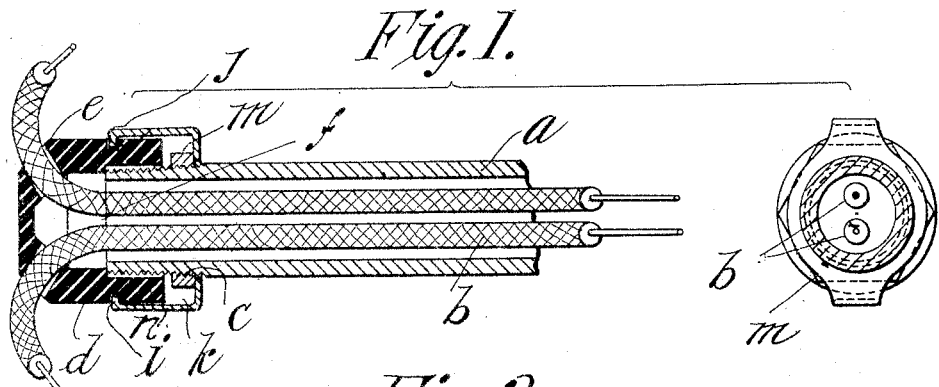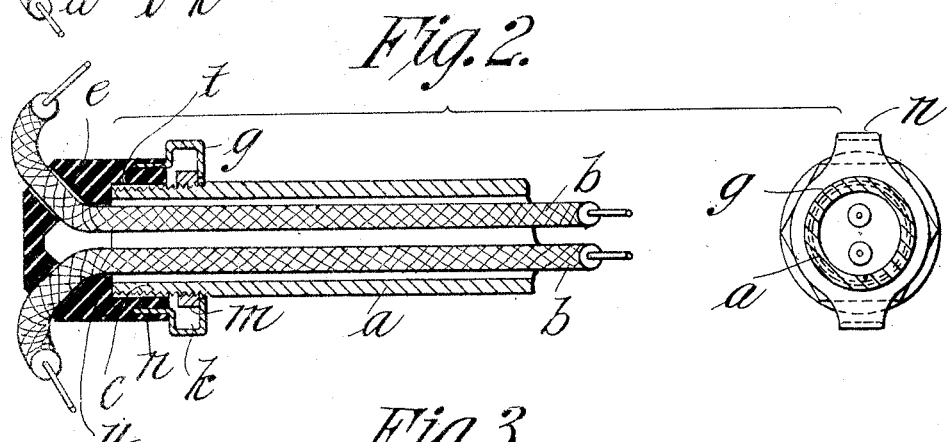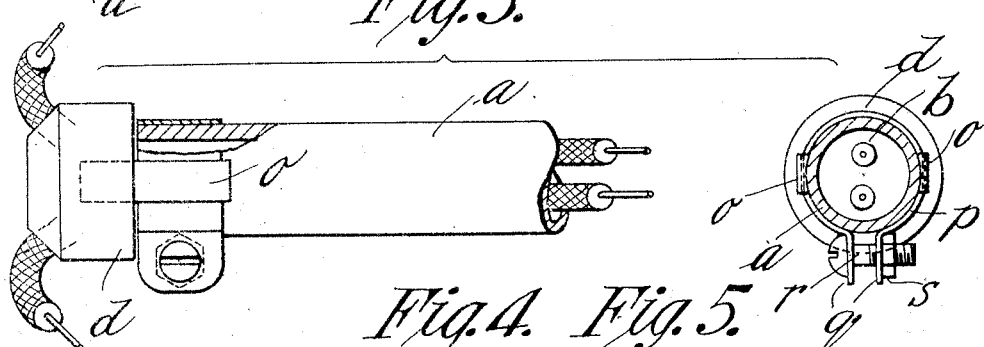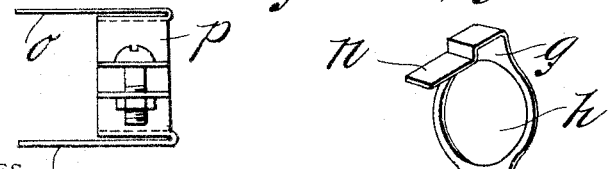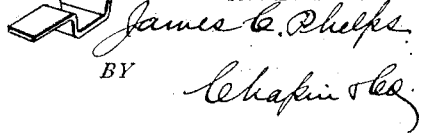

986,213.

Patented Mar. 7, 1911.

WITNESSES:
H. L. Sprague
Harry W. Bowen

INVENTOR,
James C. Phelps.
BY Chapin & Co.
ATTORNEY.

UNITED STATES PATENT OFFICE.

JAMES C. PHELPS, OF SPRINGFIELD, MASSACHUSETTS.

INSULATING-CAP.

986,213. Specification of Letters Patent. Patented Mar. 7, 1911.

Application filed September 16, 1909. Serial No. 518,008.

*To all whom it may concern:*

Be it known that I, JAMES C. PHELPS, a citizen of the United States of America, residing at Springfield, in the county of Hampden and State of Massachusetts, have invented new and useful Improvements in Insulating-Caps, of which the following is a specification.

This invention relates to improvements in insulating caps as used in electrical wiring or construction work.

An object of the invention is to provide a cap structure for the end of tubes or conduits which are used to carry electric wires. This cap is constructed of some suitable insulating material, as porcelain, hard rubber, or other well-known insulating substances. It is provided with angularly disposed outlet openings in the end portion of the cap through which electric wires extend. These openings are separated from each other whereby the wires will be spaced or separated from each other at the point where they leave the tube.

A further object of the invention is to provide means for quickly and effectually attaching the cap to the end of the tube, and whereby the cap may be quickly detached therefrom when necessary.

As a modification I provide means for attaching and detaching the cap to the end of a pipe that is not provided with threads.

Figure 6:
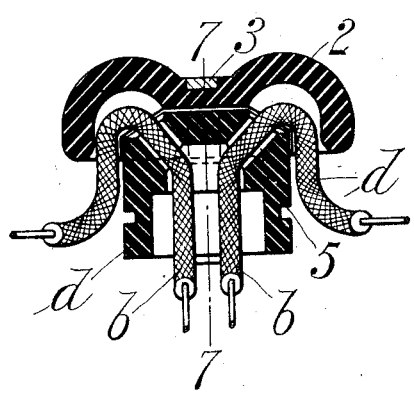
Figure 7:
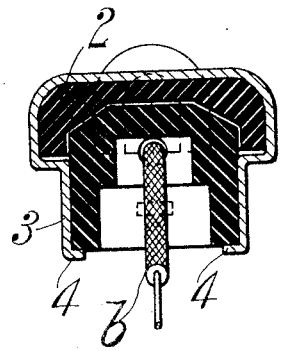
Figure 8:
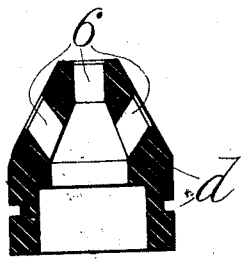

Referring to the drawings forming part of this application,—Figure 1 is a longitudinal sectional view of a portion of a pipe or conduit through the axis thereof, showing the electrical current carrying wires in place and extending through the end thereof, the cap being shown in section, and illustrating in detail the manner of attaching the same to the end of the pipe, and showing the wires separated or spaced from each other where they leave the tube. This figure is intended to illustrate the cap as being constructed of porcelain. Included in this figure is an end view of the cam construction. Fig. 2 shows a slightly modified form of cap-attaching means from that shown in Fig. 1 in which the material employed preferably is that known as "molded" material. Fig. 3 is a modification of the means for securing the cap to the pipe. This means is employed on a pipe that is not provided with threads. Fig. 4 illustrates in detail a side elevation of the construction of the attaching means shown in Fig. 3 but separated from the cap proper. Fig. 5 is a detailed perspective view showing the construction of the clip. The form illustrated is that shown in Fig. 2 wherein the cap is made of molded material. Fig. 6 is a modification showing the insulating cap with a waterproof hood for use in external work. This figure shows a section of the modification through the axis of the cap, and Fig. 7 is a sectional view on the line 7—7 of Fig. 6 illustrating the manner of attaching the waterproof hood to the cap. Fig. 8 is a further modification showing a cap for use when three wires are run through a conduit, and Fig. 9 when four wires are used.

Referring to the drawings in detail: $a$ designates a portion of the tube in which the wires $b$ for conveying currents of electricity are located. The outer ends of this tube are usually provided with threads, as indicated at $c$.

$d$ designates the cap proper, and, as shown in the several figures, this cap is provided with openings $e$ that extend at an angle to the axis of the cap, as indicated in Figs. 1 and 2. The wires $b$, as they leave the tube $a$ are drawn or passed through the angularly disposed openings $e$ and will therefore be separated from each other where they leave the tube $a$, as indicated at $f$.

In order to quickly attach the cap to the end of the tube $a$, I provide a clip $g$ that is perforated or has an opening therethrough, as shown at $h$, which is larger in diameter than the pipe $a$ so as to readily pass over the threaded portion. The clip is secured to the cap, as shown in Fig. 1, by means of the inturned ends $i$ of the prongs $n$ which extend into the opening $j$ of the cap.

$k$ designates a space between the end of the cap and the body portion of the clip $g$. Located within this space is a nut $m$ that is adapted to be screwed onto the threaded portion $c$ of the pipe whereby the cap is securely attached to the pipe $a$. The projecting portions of the nut through the space $k$ readily permit the operator to insert a wrench or spanner so as to readily rotate the nut either while attaching or detaching the cap.

In Fig. 2 (in which the cap is shown as made of molded material) the prongs or arm portions $n$ of the clip are secured to the cap by having the insulating material molded around the same during the process of construction or making of the cap; otherwise the construction shown in Fig. 2 is exactly like that shown in Fig. 1.

Referring now to Figs. 3 and 4 in which the cap $d$ is provided with means for attaching the same to a pipe, the outer end of which is not threaded: In this construction, the prongs or arms $o$ are formed as a part of the body portion $p$ of the clip and are simply bent backward parallel with the axis of the clip as shown in Fig. 4. In this form of clip the arms $o$ are preferably secured to the cap $d$, as in Fig. 2; that is, by having the insulating material molded around the same during the process of construction. The body portion $p$ of the strip is provided with two laterally projecting ears $q$ that are perforated for receiving the clamping bolt $r$, as shown in Fig. 3, whereby the clip may be readily secured to the end of the pipe $a$, as readily understood. The arms $o$ of the clip are made as shown for the reason that when the nut $s$ is turned up, the elasticity of the same will permit the clip to readily bend and grasp the end of the pipe without breaking or injuring the cap $b$.

It will be observed that the clip in Figs. 1 and 2 is provided with a recessed portion $t$ for receiving the threaded end of the tube $a$, with a shouldered portion $u$, against which the end of the tube strikes when the nut $m$ is tightly screwed against the clip $g$, whereby the cap is tightly attached to the tube.

Referring now to Fig. 6 of the drawings: The cap $d$ is provided with a waterproof hood 2 that is secured to the cap $d$ by means of the clip 3 which is preferably made of strap iron of suitable thickness. This clip extends across the top portion of the hood and downward to the lower edge of the cap where its lower prongs or arms are turned inward, as shown at 4, thus securely holding the hood in place. The electric wires $b$ are shown passing upward through the outlet openings 5 and then downward in the ordinary way, whereby the water that may collect on the wires will drip therefrom in the usual way. As stated, this form of cap is used for outdoor use as distinguished from the forms mentioned in Figs. 1 to 5, inclusive.

Referring to Fig. 8, the cap $d$ is shown provided with three outlet openings for the wires, as shown at 6, and this cap is to be used when the three wires are run through a conduit.

Figure 9:
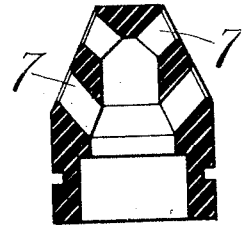

Fig. 9 is substantially the same as Fig. 8 in construction, except that four outlet openings are shown, as at 7; otherwise the construction is the same.

It is understood that the forms illustrated in Figs. 6 to 9 are designed to be used instead of the porcelain cap shown in Fig. 1, and are secured to the end of the pipe as illustrated in this figure.

From the above description, it will be seen that I have devised a very convenient and effective insulating cap for closing the end of the pipe and one that will at the same time separate the electrical wires from each other, and means whereby the cap can be readily attached to and detached from the pipe, either with a threaded or unthreaded end portion.

What I claim, is:

1. In an insulating cap, a clip, means integral therewith for securing the same to the cap, means for attaching the clip to the end portion of a tube, the outer portion of the cap being provided with openings through which wires are adapted to pass.

2. An insulating cap for closing the ends of conduits and for permitting electrical wires to pass therethrough, said cap consisting of a hollow portion for receiving the end of the pipe, a clip element permanently secured to the cap, and means for attaching the clip to the end of the pipe, and the end of the cap being provided with a plurality of openings inclined to the axis of the cap, as described, said openings being located in the end portion of the cap.

3. In combination with the end portion of an electrical conduit, a cap, having inclined openings therein, and means for attaching the cap to the end portion of the conduit, said means including a clip, prongs integral with the clip and adapted for attachment to the cap, and a nut engaging the clip.

4. In an insulating cap, a clip adapted to fit over the end of a tube, and means for securing the clip to the said tube, said clip being provided with integral parallel arranged prongs for securing the same to said cap.

5. In an insulating cap, a clip, means for attaching the clip to a tubular element, the cap being provided with a recessed portion having a shouldered part for receiving the end of the tubular element, and the cap being provided with a plurality of inclined openings through which electrical wires are adapted to pass, as described.

6. An insulating cap, a clip, means for securing the clip to said cap, the body portion of the clip being adapted to engage the end of the tube, means for securing the clip to the tube, the cap being provided with a hood, substantially as described.

7. An insulating cap for closing the open end of an electrical conduit, a clip for attaching the cap to the conduit, said clip having an opening therethrough for receiving the threaded end of the conduit, the conduit-receiving end of the clip being spaced from the end of the cap, and a nut in the space engaging the threads of the conduit, whereby when the nut is operated the cap will be drawn into contact with the end of the tube, as described.

8. A perforated insulating cap for the end of electrical conduits, a clip for attaching the same to the conduit and comprising a perforated flat portion having prongs integral therewith, and permanently secured to the cap, a nut engaging the perforated flat portion of the clip and the threads of the conduit for drawing the cap toward the end of the conduit.

JAMES C. PHELPS.

Witnesses:
K. I. CLEMONS,
H. W. BOWEN.